(12) United States Patent
Schneider et al.

(10) Patent No.: US 12,508,928 B2
(45) Date of Patent: Dec. 30, 2025

(54) POSITIONING UNIT FOR A CHARGING STATION, AND METHOD FOR MAKING CONTACT

(71) Applicant: SCHUNK TRANSIT SYSTEMS GMBH, Wettenberg (DE)

(72) Inventors: Lothar Schneider, Lahnau (DE); Timo Staubach, Herbstein (DE); Holger Leib, Heuchelheim (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 818 days.

(21) Appl. No.: 17/769,254

(22) PCT Filed: Oct. 17, 2019

(86) PCT No.: PCT/EP2019/078272
§ 371 (c)(1),
(2) Date: Apr. 14, 2022

(87) PCT Pub. No.: WO2021/073745
PCT Pub. Date: Apr. 22, 2021

(65) Prior Publication Data
US 2024/0131942 A1    Apr. 25, 2024
US 2024/0227595 A9    Jul. 11, 2024

(51) Int. Cl.
*B60L 53/35*    (2019.01)
*B60L 53/16*    (2019.01)

(52) U.S. Cl.
CPC ............... *B60L 53/35* (2019.02); *B60L 53/16* (2019.02); *B60L 2200/18* (2013.01)

(58) Field of Classification Search
CPC ....... B60L 53/35; B60L 53/16; B60L 2200/18
(Continued)

(56) References Cited

U.S. PATENT DOCUMENTS

| | | | |
|---|---|---|---|
| 2,237,590 A | | 4/1941 | Delachaux |
| 5,359,884 A | * | 11/1994 | Fey ........................ B62M 25/08 73/115.01 |

(Continued)

FOREIGN PATENT DOCUMENTS

| | | |
|---|---|---|
| CN | 105391135 A | 3/2016 |
| CN | 105416075 A | 3/2016 |

(Continued)

OTHER PUBLICATIONS

PCT International Search Report and Written Opinion, PCT/EP2019/078272, Jul. 6, 2020, 24 pages.

(Continued)

*Primary Examiner* — Suresh Memula
(74) *Attorney, Agent, or Firm* — Quarles & Brady LLP

(57) ABSTRACT

A positioning unit and a method for forming an electrically conductive connection between a stationary charging station and a vehicle using a positioning unit, the positioning unit having a positioning device and a drive unit for driving the positioning device. A charging contact is positionable between a contacting position for transmitting current and a retraction position for interrupting current by the positioning device. The drive unit includes a displacement drive acting on the positioning device and a spring device capable of providing a contact force on the charging surface. The positioning device includes a fixed bearing, an upper segment, and a lower segment, which are linearly movable in the vertical displacement direction. The spring device includes a contact spring coupled with the fixed bearing and the upper segment, which is moveable in relation to the lower segment by means of the displacement drive.

20 Claims, 4 Drawing Sheets

(58) Field of Classification Search
USPC .......................................................... 320/109
See application file for complete search history.

(56) References Cited

U.S. PATENT DOCUMENTS

| | | | |
|---|---|---|---|
| 8,058,841 B2 * | 11/2011 | Chander | ............ B65H 75/4402 |
| | | | 320/115 |
| 10,017,062 B2 * | 7/2018 | Kufner | .................... B60L 53/30 |
| 11,453,299 B2 * | 9/2022 | Morris | .................... B60L 53/18 |
| 2011/0181241 A1 * | 7/2011 | Badger | ................... B60L 53/35 |
| | | | 320/109 |
| 2016/0167530 A1 | 6/2016 | Bolik et al. | |
| 2016/0311335 A1 * | 10/2016 | Sarkar | ..................... B60L 53/35 |
| 2017/0158074 A1 | 6/2017 | Buehs et al. | |
| 2017/0210238 A1 | 7/2017 | Buehs et al. | |
| 2017/0217324 A1 | 8/2017 | Buehs et al. | |

FOREIGN PATENT DOCUMENTS

| | | | | |
|---|---|---|---|---|
| DE | 102015217380 A1 * | 3/2017 | .......... | B60L 11/1827 |
| WO | WO-2011090769 A1 * | 7/2011 | .......... | B60L 11/1818 |
| WO | 2017042065 A1 | 3/2017 | | |
| WO | 2018130618 A1 | 7/2018 | | |
| WO | WO-2021073745 A1 * | 4/2021 | ................ | B60L 5/42 |

OTHER PUBLICATIONS

China National Intellectual Property Administration, First Office Action and Search Report, Application No. 201980101370.5, May 30, 2024, 10 pages [English Language Translation Only].

* cited by examiner

POSITIONING UNIT FOR A CHARGING STATION, AND METHOD FOR MAKING CONTACT

This application represents the national stage entry of PCT International Patent Application No. PCT/EP2019/078272 filed on Oct. 17, 2019, the contents of which are hereby incorporated by reference as if set forth in their entirety herein.

The disclosure relates to a positioning unit and a method for forming an electrically conductive connection between a stationary charging station and a vehicle, in particular an electric bus or the like, an electric charging contact of the positioning unit being movable in relation to a charging contact surface and being contactable therewith by means of the positioning unit, the positioning unit having a positioning device and a drive device for driving the positioning device, the charging contact being able to be positioned between a contacting position for transmitting current and a retraction position for interrupting current by means of the positioning device, the drive device having a displacement drive for forming a displacing force acting on the positioning device and a spring device mechanically interacting with the displacement drive, the spring device comprising at least one contact spring, a contact force acting on the charging surface being able to be produced by the displacement drive and the contact force.

Such positioning units and methods are known from the state of the art and are commonly used for electrically driven vehicles. These vehicles can be electric busses but also other vehicles in general, such as a train or a tram, which are not permanently electrically connected to an overhead wire or the like. With these vehicles, an electric energy storage is charged by a charging station at a stop or a motor pool. The vehicle is electrically connected to the charging station at the motor pool, the energy storage of the vehicle being charged overnight, for example.

To produce an electrically conductive connection between the vehicle and the charging station, a contact device is used which is mounted or positioned on the positioning unit above a vehicle at a parking space of the vehicle in the motor pool. A charging contact of the contact device is moved on a roof of the vehicle toward a charging contact surface by means of the positioning unit and an electric connection is produced. A contact device can, for instance, comprise at least four charging contacts; two charging contacts commonly serving for transmitting energy, one charging contact commonly serving as a ground conductor and an additional charging contact commonly serving for transmitting data. When guiding charging contacts to the corresponding charging contact surfaces of the vehicle, it is essential that the charging contact is pressed to the charging contact surface using a sufficiently large, though not too large, contact force in order to be able to ensure a safe electrical connection. A positioning unit of this kind is known from DE 10 2015 217 380 A1, for example.

In already existing motor pools, corresponding charging stations are installed above parking spaces or paths of vehicles in the com-pounds or throughout the grounds of the motor pool when converting a vehicle fleet to electric vehicles. For this purpose, positioning units are also used, such as the ones used on masts of stops. As the facilities of motor pools are already existing infrastructures or buildings, the positioning units used at stops cannot be readily used, for example in com-pounds. The height of a ceiling may not be high enough for mounting a positioning unit or the positioning unit has to be installed far below a ceiling. At the same time, the positioning units designed for the use at a stop must be robust against environmental influences and are consequently comparatively heavy, which increases the production costs of the positioning unit. Furthermore, the known positioning units are built comparatively large since enough room is available at a mast of a stop, which is disadvantageous in a compound due to, for example, beams or supply lines in the ceiling area.

It is therefore the object of the disclosure to propose a positioning unit and a method for forming an electrically conductive connection between a stationary charging station on a vehicle which both enable charging a vehicle at a motor pool flexibly and cost-efficiently.

This object is attained by a positioning unit having the features of claim 1 and a method having the features of claim 18.

In the positioning unit according to the disclosure for forming an electrically conductive connection between a stationary charging station and a vehicle, in particular an electric bus or the like, an electric charging contact of the positioning unit is movable in relation to a charging contact surface and is contactable therewith by means of the positioning unit, the positioning unit having a positioning device and a drive device for driving the positioning device, the charging contact being able to be positioned between a contacting position for transmitting current and a retraction position for interrupting current by means of the positioning device, the drive device having a displacement drive for forming a displacing force acting on the positioning device and a spring device mechanically interacting with the displacement drive, the spring device comprising at least one contact spring, a contact force acting on the charging contact surface being generable by the displacement drive and the contact spring, the positioning device comprising a fixed bearing, an upper segment, which is linearly movable on the fixed bearing in a vertical displacement direction, and a lower segment, which is linearly movable on the upper segment in the vertical displacement direction, the contact spring being coupled with the fixed bearing and the upper segment, the upper segment being moveable in relation to the lower segment by means of the displacement drive.

Consequently, the positioning unit is a component of a stationary charging station for an electrically driven vehicle and serves to move the electric charging contact or electric charging contacts to a charging contact surface of the vehicle in each instance, which are disposed on a vehicle roof, and to electrically contact them therewith. Thus, it is also possible to supply the vehicle with electric energy at, for example, a motor pool and to store this energy in the vehicle. The charging contact(s) is moved onto the corresponding charging contact surface using the positioning unit which is disposed above the vehicle on a carrier structure or ceiling structure of a compound. For this purpose, the charging contact(s) is disposed on a lower end of the positioning unit and can be moved by an upper retraction position to a lower contacting position for transmitting current and contacting the charging contact surfaces. In the contacting position, a defined contact force is exerted on the respective charging contact surfaces.

The charging contact(s) is moved using the positioning device which can be actuated using a displacement drive of the drive device. The drive device causes a displacing force on the positioning device, the displacement drive interacting with the spring mechanism with the result that the contact force is produced on the charging contact surface by the displacement drive and the contact spring of the spring mechanism.

According to the disclosure, the positioning device has a fixed bearing, which is mountable on a carrier structure or ceiling structure so as to be immobile, and an upper segment, which is disposed on the fixed bearing and is linearly movable on the fixed bearing in a vertical displacing direction. Furthermore, a lower segment of the positioning device is disposed on the upper segment, the lower segment also being linearly movable on the upper segment in the vertical displacing direction. The lower segment is thus coupled with the upper segment and the upper segment is coupled with the fixed bearing and movable between the retraction position and the contacting position in the manner of a telescope. Furthermore, the contact spring is coupled with the fixed bearing and the upper segment and the upper segment can be moved in relation to the lower segment by means of the displacement drive. A movement of the lower segment via the displacement drive in relation to the upper segment causes the lower segment to be moved to the contacting position or the retraction position and thus a corresponding movement of the charging contact.

If the charging contact abuts against the charging contact surface, a continued movement of the actuating drive can be converted to forming the contact force owing to the contact spring between the fixed bearing and the upper segment. The upper segment then moves in relation to the fixed bearing if the lower segment can no longer move because of the abutment of the charging contact to the charging contact surface. Retracting the charging contact to the retraction position using the positioning unit accordingly occurs in a reversed manner. A positioning unit formed in this manner can be produced particularly easily and is comparatively compact in comparison to the positioning units having articulated arms. Despite this, a corresponding distance between the retraction position and the contacting position can be bridged according to an arbitrary length of the upper segment and the lower segment, meaning the positioning unit can be easily formed for different heights of vehicles and carrier structures or roof structures. Owing to the compact design of the positioning unit, it can also be flexibly disposed on a roof structure, without having to modify the roof structure. Overall, the positioning unit can therefore be used advantageously at a motor pool with little effort while also being inexpensive in its production.

The displacement drive can be coupled with the upper segment and the lower segment in such a manner that the upper segment is movable in relation to the lower segment by means of the displacing force. The displacing force can consequently be produced between the upper segment and the lower segment, meaning a relative movement from the upper segment to the lower segment is caused. To produce the displacing force between the upper segment and the lower segment, the displacement drive can be disposed in a fixed manner on the upper segment or the lower segment. Disposing the displacement drive away from the upper segment and the lower segment is also possible, provided the displacement drive is directly coupled with the upper segment and the lower segment, for example via actuating elements.

The displacement drive and the contact spring can be coupled in such a manner with each other in a mechanical series connection that the contact force acting on the charging contact surface can be produced by the displacement drive and the contact spring. Via the mechanical series connection of the displacement drive and the contact spring, the positioning device can be moved via the displacing force of the displacement drive and the displacing force can be further increased when the charging contact surface is contacted with the charging contact. The further increased displacing force is then stored by the contact spring connected to the displacement drive and then conveyed to the positioning device and the charging contact surface as a contact force. The increase in the displacing force is therefore not used for a continued movement of the positioning device toward the charging contact surface but for producing or increasing the contact force on the charging contact surface. Depending on a deadweight of the segments and the charging contacts or a deadweight of the components disposed on the fixed bearing, the deadweight can also be at least partially compensated by the contact spring. When contacting the charging contact surface with the charging contact, the contact spring is initially tensed by the deadweight or stores spring force. The further increased displacing force is yielded from the deadweight and the load removal of the contact spring connected to the displacement drive, the deadweight being transferred as a contact force to the positioning device or charging contact surface. In this instance as well, the increase in the displacing force is not used for a continued movement of the positioning device toward the charging contact surface, but for producing or increasing the contact force on the charging contact surface. Thus it becomes possible to produce an essentially constant contact force on the charging contact surface in a retraction position of the charging contact irrespective of a height of the charging contact surface over a road or of a relative distance of the charging contact surface from the charging contact.

The contact spring can be coupled with the fixed bearing and the upper segment. According to definition, the fixed bearing cannot be moved in relation to additional bearings of the positioning device and the drive device. The upper segment can be directly connected to the fixed bearing via the contact spring.

The contact spring can be a tension spring and/or compression spring. In principle, any kind of spring is suitable which permits producing a spring force and/or tensile force or compression force between the fixed bearing and the upper segment when these components are moved in relation to one another. Besides one individual contact spring, several contact springs can also be provided which make up the spring mechanism.

The fixed bearing and the upper segment can be connected to an upper linear guide, the upper segment and the lower segment being able to be connected to a lower linear guide. A linear guide can be realized particularly easily by two guide elements which are connected in a form-fitted manner and can be shifted in an axis in relation to each other.

The positioning device can have at least one additional segment which connects the upper segment to the lower segment and is freely movable in relation to the upper segment and the lower segment linearly in the vertical displacing device. In principle, the positioning device can have a plurality of such segments which are connected to each other in a series arrangement. This kind of connection between the segments permits to push together the positioning device in the retraction position to a small space having a low construction height, depending on the number and length of the respective segments.

The positioning unit can be formed particularly inexpensively if the fixed bearing and the segments are made up of profiles which are disposed coaxially to one another. The measurements of the corresponding profiles can be such that the profiles can be inserted into or in relation to one another. If the profiles are hollow profiles, an inner surface of a hollow profile can abut against an outer surface of a hollow profile in such a manner that a telescope guide is realized between both hollow profiles. Despite this, a distance between the hollow profiles can be so large that a gap is formed between the hollow profiles. A linear guide for shifting the hollow profile in relation to one another can be disposed in the gap solely for this purpose. The hollow profiles can have a square, rectangular or even round cross section. Instead of hollow profiles, solid profiles, such as rods or plates, can also be used.

The profile of the fixed bearing can form a casing of the positioning device within which the segments can be received. It can also be intended for the profile of the fixed bearing to have the comparatively largest cross section of all profiles. A length of the remaining profiles can be such that it can be received essentially within the casing of the positioning device realized thus. Vice versa, it is also possible for the profile of the lower segment to form the casing of the positioning device.

The upper segment can be inclinable on the fixed bearing by an angle $\alpha$ of $>0°$ to $5°$ in relation to a vertical axis extending in the vertical displacement direction and/or the lower segment can be inclinable on the upper segment by an angle $\alpha$ of $>0°$ to $5°$ in relation to a vertical axis extending in the vertical displacement direction. In particular, the fixed bearing and/or the segments can be connected in such a manner to each other that a horizontal relative movement is also possible. Provided a linear guide for realizing the vertical relative movement of the fixed bearing and the segments is realized, the linear guide can be realized having a corresponding play or the linear guide itself can be realized so as to be pivotable by the angle $\alpha$. The option of at least pivoting the lower segment by the angle $\alpha$ can be used as compensation for smaller movements or wavering of the vehicle below the positioning unit, e.g., when a person gets on or off a vehicle or when a vehicle is loaded or unloaded.

The displacement drive can have a position sensor or path sensor, by means of which a spring path of the contact spring is determinable, and/or a force sensor, by means of which the contact force is determinable. By limiting the spring path of the contact spring and/or owing to the one force sensor, a contact force acting on the charging contact surface can be limited. The displacement drive being shut off when reaching a specific spring path or a measured force can be what causes the limitation. Damage to the positioning unit or the charging contact surface can thus be easily avoided.

The displacement drive can have a control element and an electric motor or a pneumatic drive which can be controlled by means of the control element. Furthermore, the displacement drive can have a backup battery which ensures the positioning device is automatically retracted to the retraction position via an emergency power supply from the backup battery in the event of a power outage or a different malfunction. The backup battery can be integrated in the displacement drive. Instead of the electric motor or the pneumatic drive, other suitable drives can also be provided.

The electric motor can be a linear motor, preferably a spindle drive, the electric motor being disposed on the upper segment or the lower segment in a fixed manner. Optionally, the spindle drive can also be realized to be self-locking, depending on the inclination of the spindle. The positioning device can then be easily moved to a desired position and be fixed without further auxiliary means. The linear drive can have a path sensor by means of which a movement area of the positioning device can be limited. An incremental encoder or an absolute encoder can be used as a path sensor, for example. It then becomes possible to always determine an exact work position of the linear drive.

The displacing device can be realized such that a torque of the electric motor is registrable by the control element, the contact force being controllable by the control element as a function of the torque of the electric motor. The control element can be made from control electronics for the electric motor. In this context, the control electronics can be directly integrated in the electric motor. The control element can register a torque of the electric motor via, for example, the exerted energy and control the electric motor such that the defined contact force is produced on the charging contact surface by the electric motor via the positioning device and the charging contact. It is then possible to actively adjust an indirect force effect on the positioning device and, if required, on the charging contact, optionally also as a function of different influential factors. Thus it becomes possible to realize a consistently large contact force on the charging contact surface irrespective of a relative distance of the charging contact surface and the positioning unit or a height of the vehicle.

The positioning unit can have a holding frame for fastening the positioning device above a vehicle, the fixed bearing being able to be disposed on the holding frame. The holding frame can be realized such that it can be easily fastened to a mast or a ceiling structure of a building. The contact spring of the spring mechanism can therefore generally be connected to the holding frame.

The fixed bearing can be fastened to the holding frame so as to be adjustable in the vertical displacing device. If the fixed bearing is made of, for example, a hollow profile extending in the vertical direction, the holding frame can surround the fixed bearing. Depending on the manner in which the fixed bearing is fastened to the holding frame, setting a height of the fixed bearing over a road and thus, for example, an adjustment to a ceiling height can be easily permitted. In a particularly simple embodiment, the holding frame can also be welded or screwed to the fixed bearing. If the fixed bearing is essentially disposed on an upper side of the holding frame, the fixed bearing and thus a major part of the positioning unit can be hidden in a ceiling.

The positioning unit can have a contact device having two charging contact carriers having at least two charging contacts disposed thereon, the charging contacts being connected to each other via parallel rods of the contact device having two parallel connective rods and having two parallel carrier rods, the carrier rods each being connected to the connective rods via spaced-apart connective joints in one of two parallel movement planes and forming a parallelogram in conjunction with the connective rods. With such a positioning unit, at least four charging contacts can be moved on each charging contact surface of a vehicle and be electrically contacted therewith. Furthermore, it is also possible to evenly distribute or produce the contact force on the corresponding charging contact surface. The contact device can be disposed on the lower segment such that the contact device is held essentially in the center. The parallel rods can be made of comparatively long connective rods and short carrier rods, which are vertical and are connected to the connective rods via the connective joints. Thus, the connective rods can be inclined in relation to a horizontal plane, the carrier rods being able to be always disposed vertically within both parallel movement planes. If the connective joints are disposed coaxially to the carrier joints, the force of a contact force exerted centrally on the contact device is always evenly distributed on both carrier rods irrespective of the incline of the connective rods.

The connective rods can be connected to the lower segment of the contact device in a parallel carrier plane, which extends centrally to the movement planes, via two spaced-apart carrier joints, the charging contact carriers each being able to be connected to the carrier rod via a swivel joint, the swivel joints being orthogonally disposed relative to the connective joints, the charging contact carriers being able to coaxially hold the corresponding charging contacts in relation to the swivel axis. The charging contact carriers can each be disposed on the carrier rods via the swivel joint. As the charging contacts are also coaxially disposed on the corresponding charging contact carrier in relation to the swivel joint, the contact force can be distributed proportionately to the corresponding two charging contacts, which are disposed on the charging contact carrier, via the carrier rods or the swivel joint. If the swivel joints are disposed orthogonally in relation to the connective joints, it is possible to adjust the charging contacts to a transverse incline and longitudinal incline of a vehicle in its height in relation to the vehicle and to simultaneously attain a safe contacting of each of the corresponding charging contact surfaces of the vehicle using simple means and a contact force which is essentially proportionately the same size.

In the method according to the disclosure for forming an electrically conductive connection between a stationary charging station and a vehicle, in particular an electric bus or the like, an electric charging contact surface of a positioning unit is moved in relation to a charging contact surface and is contacted therewith by means of the positioning unit, a positioning device of the positioning unit being driven by a drive unit of the positioning unit, the charging contact being positioned between a contacting position for transmitting current and a retraction position for interrupting current by means of the positioning device, a displacing force acting on the positioning device being produced by means of a drive device of the drive device, and a spring device of the drive device mechanically interacting with the displacement drive, a contact force acting on the charging surface being produced by the displacement drive and at least one contact spring, an upper segment of the positioning device being linearly moved on a fixed bearing in a vertical displacement direction, and a lower segment of the positioning device being linearly moved on the upper segment in the vertical displacement direction, the contact spring being coupled with the fixed bearing and the upper segment, the upper segment being moved in relation to the lower segment by means of the displacement drive. Regarding the advantages of the method according to the disclosure, reference is made to the description of advantages of the positioning unit according to the disclosure.

A movement of the positioning unit from the retraction position to the contacting position can comprise the following steps:
a. moving the lower segment and the electric charging contact disposed thereon downward by means of the displacement drive and in relation to the upper segment, the upper segment abutting against a stop of the positioning device;
b. stopping the lower segment in the contacting position by abutting the electric charging contact against the charging contact surface;
c. moving the upper segment upward and in relation to the lower segment and the fixed bearing by continuing to operate the displacement drive and simultaneously generating the contact force by tensing and relaxing the contact spring coupled with the upper segment and the fixed bearing.

The upper segment can abut against the stop following a spring force exerted using the spring mechanism and/or a dead weight of the components disposed on the fixed bearing. After the charging contact has been extended so far down by means of the displacement drive that the charging contact comes to abut against the charging contact surfaces, a movement of the lower segment is stopped although the displacement drive is operated continuously. A movement of the displacement drive is then conveyed to the upper segment, which is shifted upward. Since the contact spring is disposed between the upper segment and the fixed bearing, the upper segment is lifted from the stop by the relative movement of the upper segment and the fixed bearing and, depending on whether the contact spring is a tension spring or a compression spring, is pressed against a spring force of the contact spring or is moved toward a stored spring force of the contact spring. The contact spring in turn causes the contact force to be produced on the charging contact surface, either by the deadweight of the components disposed on the fixed bearing and an increase in the spring force or by the deadweight of the components disposed on the fixed bearing and a decrease in the spring force. By continuing the operation of the displacement drive, the spring force is further increased until the displacement drive is switched off, e.g., by means of a final position switch. A movement of the charging contact or the positioning device to the retraction position occurs in a reversed manner.

Further advantageous embodiments of the method are derived from the description of features of the dependent claims referring to device claim 1.

In the following, a preferred embodiment of the disclosure is explained in further detail with reference to the enclosed drawings.

Figure 4A:
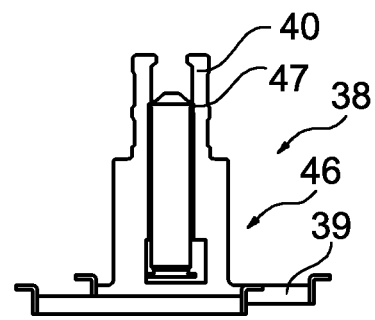
Figure 4B:
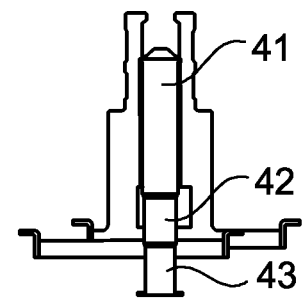
Figure 4C:
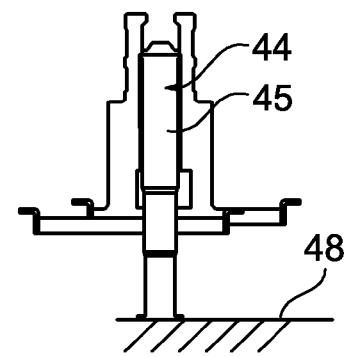
Figure 4D:
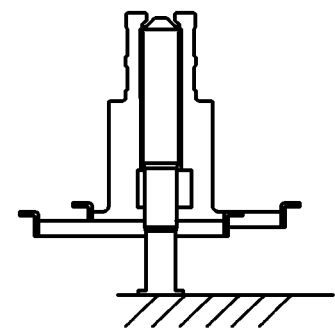

FIG. 4*a* shows a second embodiment of a positioning in first work position;

FIG. 4*b* shows the positioning unit in a second work position;

FIG. 4*c* shows the positioning unit in a third work position;

FIG. 4*d* shows the positioning unit in a fourth work position.

Figure 1:
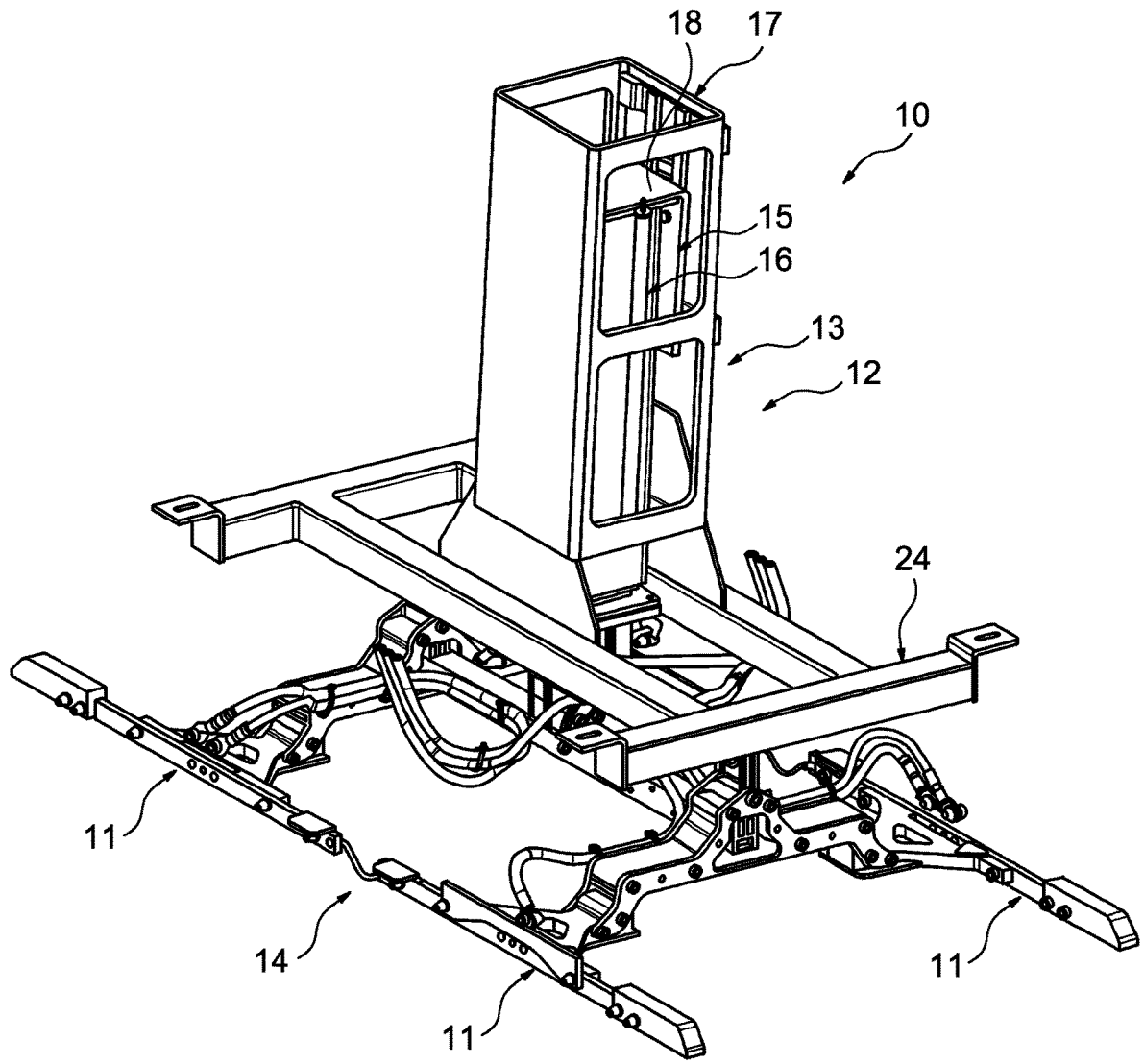
FIG. 1 shows a perspective view of a first embodiment of a positioning unit in a first work position.
Figure 2:
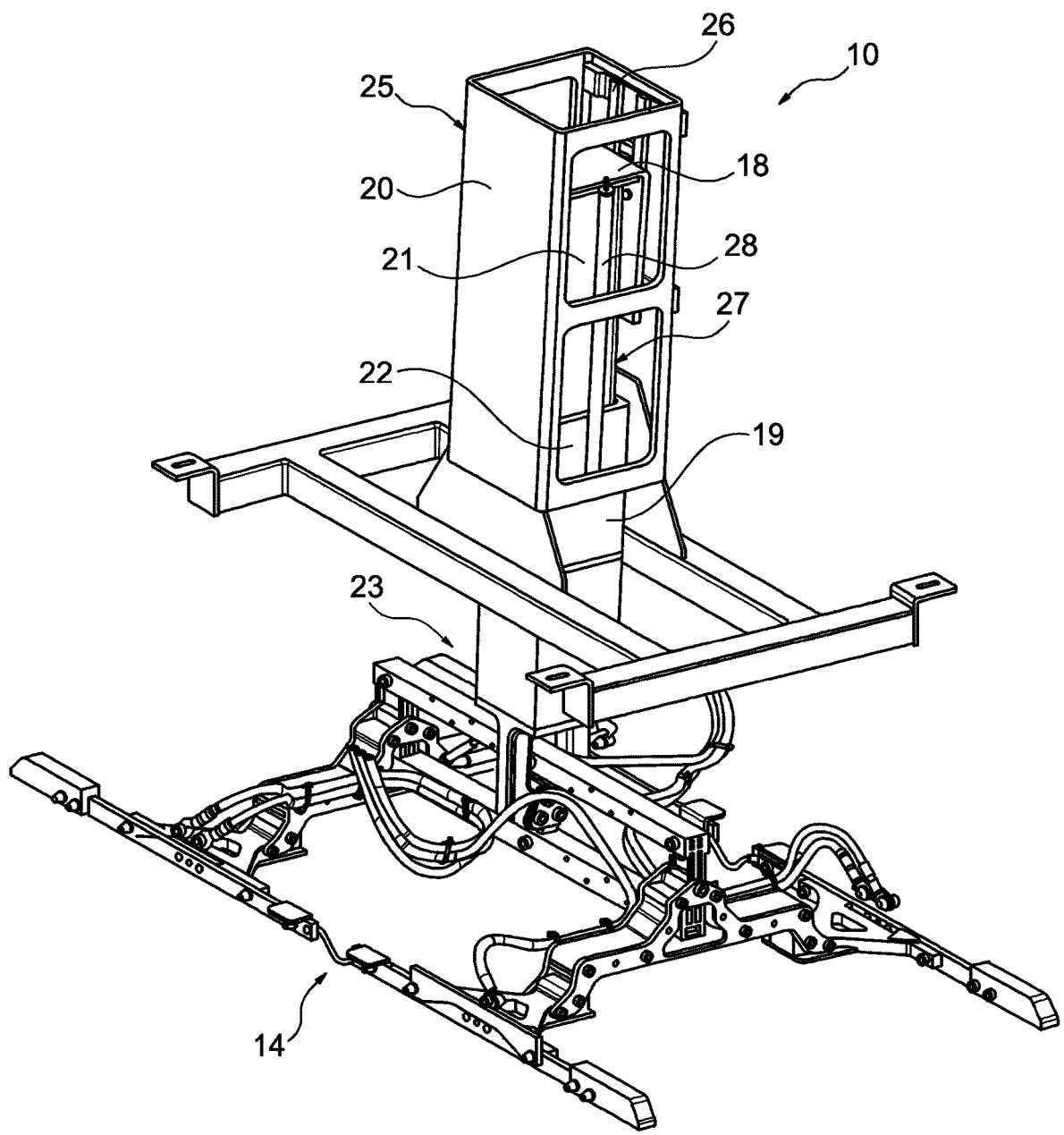
FIG. 2 shows the positioning unit in a second work position.
Figure 3:
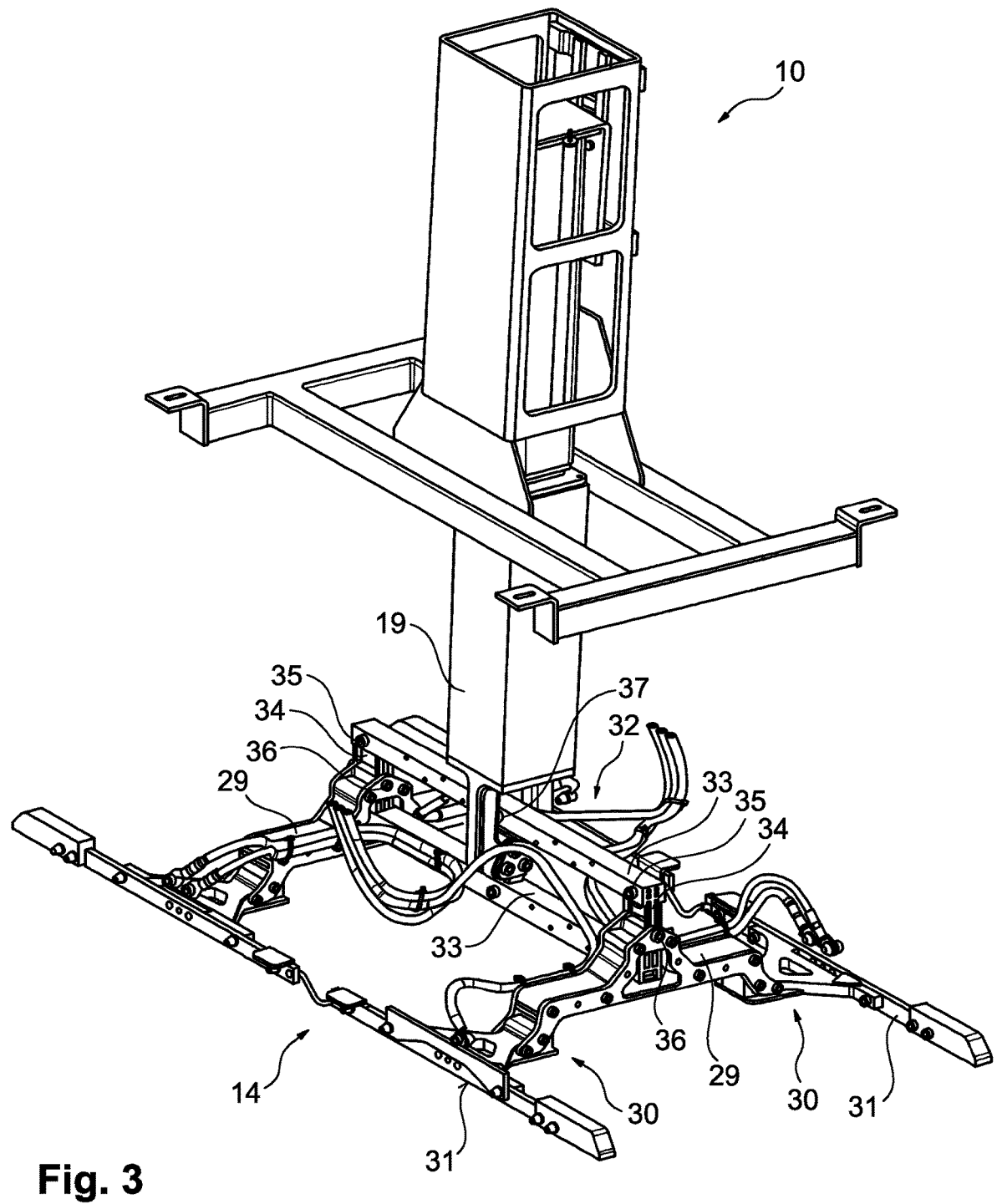
FIG. 3 shows the positioning unit in a third work position.

FIGS. 1 to 3 show a positioning unit 10 for forming an electrically conductive connection between a stationary charging station (not illustrated) and a vehicle (not illustrated), in particular an electric bus or the like, disposed below the positioning unit. Using positioning unit 10, four electric charging contacts 11 of positioning unit 10 can be moved on a roof of the vehicle in relation to charging contact surfaces (not illustrated) and be contacted therewith. Positioning unit 10 comprises a positioning device 12 and a drive device 13 for driving positioning device 12. In this context, charging contacts 11 are positioned between a contacting position shown in FIGS. 2 and 3 for transmitting current and a retraction position shown in FIG. 1 for interrupting current transmission by means of positioning device 12. Charging contacts 11 are components of a contact device 14 which is disposed on positioning device 12.

Drive device 13 has a displacement drive (not further illustrated) for producing a displacing force, which acts on positioning device 12, and for forming a spring mechanism 15, which mechanically interacts with the displacement drive. Spring mechanism 15 comprises contact springs 16, a contact force being produced on the respective charging contact surfaces by the displacement drive and contact springs 16. Furthermore, positioning device 12 comprises a fixed bearing 17, an upper segment 18, which is linearly movable on the fixed bearing in a vertical displacing direction, and a lower segment 19, which is linearly moveable on upper segment 18 in the vertical displacing direction. Fixed bearing 17, upper segment 18 and lower segment 19 are each made of profiles 20, 21 and 22, respectively. Contact device 14 is fastened to a lower end 23 of profile 22 of lower segment 19. Profile 20 forming fixed bearing 17 is fastened on a holding frame 24 of positioning unit 10. Holding frame 24 can be fastened to a ceiling structure (not further illustrated) of a building, such as a compound of a motor pool. Furthermore, profile 17 forms a casing 25 of positioning device 12 within which profiles 21 and 22 can be received in the retraction position.

Between profile 20 and profile 21 of upper segment 18, a linear guide 26 is disposed such that profile 20 is easily movable in the vertical displacing direction in relation to profile 21. Furthermore, a linear guide 27 is formed between profile 21 of upper segment 18 and profile 22 of lower segment by profile 22 surrounding profile 21 and abutting thereagainst so as to be displaceable in the longitudinal direction. Contact springs 16 are coupled with profile 20 of the fixed bearing and upper segment 18 and are formed by tension/compression springs 28.

Contact device 14 has two charging contact carriers 29, on whose distal ends 30 contact strips 31 are fastened, which form charging contacts 22. Essentially arc or O-shaped charging contact carriers 29 are connected to parallel rods 32 of contact device 14, which are made up of connective rods 33 and vertically disposed carrier rods 34. Connective rods 33 are movably connected to carrier rods 34 via connective joints 35, charging contact carriers 39 each being movably connected to carrier rods 34 via a swivel joint 36. Furthermore, carrier joints 37 movably connect lower segment 19 to connective rods 33.

A combined view of FIGS. 4a to 4d shows a positioning unit 38 without a contacting device in different work positions. In this instance, positioning unit 38 is formed having holding frame 39, a fixed bearing 40 and a lower segment 41, which are disposed on holding frame 39, an additional segment 42 and a lower segment 43. Upper segment 41, additional segment 42 and lower segment 43 are connected to each other and are movable in the manner of a telescope. Furthermore, a spring mechanism 44 having a contact spring 45 is provided, contact spring 45 being coupled with fixed bearing 40 and upper segment 41. A displacement drive (not illustrated) is disposed within segments 41, 42 and 43 and causes upper segment 41 to move in relation to lower segment 43, additional segment 42 also being moved depending on the displacing length of the displacement drive.

FIG. 4a first shows a retracted position of positioning device 46 of positioning unit 38 realized accordingly. Upper segment 41 abuts against fixed bearing 40 on a stop 47 in the retraction position. By operating the displacement drive, at least lower segment 43 is moved out of upper segment 41 and is lowered downward according to the illustration in FIG. 4b. According to the illustration in FIG. 4c, lower segment 43 or the contact device (not illustrated in this instance) comes into contact with a counter bearing 48 which can be a charging contact device (also not illustrated) on a roof of a vehicle. By continuing to operate the displacement drive, at least lower segment 43 is further moved out of upper segment 41, upper segment 41 being moved upward owing to counter bearing 48. Upper segment 41 is consequently lifted by stop 47 and contact spring 45 is tensed or relaxed, depending on the type of contact spring, tension spring or compression spring, is used. A spring force of contact spring 45 causes a contact force on the charging contact surface (not illustrated). Positioning device 38 is therefore in the contacting position. A change from the contacting position to the retraction position can take place in a reversed manner.

The invention claimed is:

1. A positioning unit for forming an electrically conductive connection between a stationary charging station and a vehicle, in particular an electric bus or the like, an electric charging contact of the positioning unit being movable in relation to a charging contact surface and being connectable thereto by means of the positioning unit, the positioning unit comprising a positioning device and a drive unit for driving the positioning device, the charging contact being able to be positioned between a contacting position for transmitting current and a retraction position for interrupting current by means of the positioning device, the drive device having a displacement drive for producing a displacing force acting on the positioning device and a spring device mechanically interacting with the displacement drive, the spring device comprising at least one contact spring, a contact force acting on the charging surface being able to be produced by the displacement drive and the contact force,
wherein
the positioning device comprises a fixed bearing, an upper segment, which is linearly movable on the fixed bearing in a vertical displacement direction, and a lower segment, which is linearly moveable on the upper segment in the vertical displacement direction, the contact spring being coupled with the fixed bearing and the upper segment, the upper segment being moveable in relation to the lower segment by means of the displacement drive.

2. The positioning device according to claim 1, wherein the displacement drive is coupled in such a manner with the upper segment and the lower segment that the upper segment is movable in relation to the lower segment by means of the displacing force.

3. The positioning device according to claim 1, wherein the displacement drive and the contact spring is coupled in such a manner with a mechanical series connection that the contact force is generable on the charging contact surface by the displacement drive and the contact spring.

4. The positioning unit according to claim 1, wherein the contact spring is a tension spring and/or a compression spring.

5. The positioning unit according to claim 1, wherein the fixed bearing and the upper segment are connected to an upper linear guide, the upper segment and the lower segment being connected to a lower linear guide.

6. The positioning unit claim 1, wherein the positioning device has at least one additional segment which connects the upper segment to the lower segment and is freely linearly movable in relation to the upper segment and the lower segment in the vertical displacement direction.

7. The positioning unit according to claim 1, wherein the fixed bearing and the segments are made of profiles disposed coaxially in relation to one another.

8. The positioning unit according to claim 7, wherein the profile of the fixed bearing forms a casing of the positioning device within which the segments are receivable.

9. The positioning unit according to claim 1, wherein the upper segment is inclinable on the fixed bearing by an angle $\alpha$ of $>0°$ to $5°$ in relation to a vertical axis extending in the vertical displacement direction and/or the lower segment is inclinable on the upper segment by an angle α of >0° to 5° in relation to a vertical axis extending in the vertical displacement direction.

10. The positioning unit according to claim 1, wherein the displacement drive has a position sensor or path sensor, by means of which a spring path of the contact spring is determinable, and/or a force sensor, by means of which the contact force is determinable.

11. The positioning unit according to claim 1, wherein the displacement drive has a control element and an electric motor or a pneumatic drive, which is controllable by means of the control element.

12. The positioning unit according to claim 11, wherein the electric motor is a linear motor the electric motor being disposed on the upper segment or the lower segment in a fixed manner.

13. The positioning unit according to claim 12, wherein the electric motor is a spindle drive.

14. The positioning unit according to claim 11, wherein the displacement drive is realized in such a manner that a torque of the electric motor is registered by the control element, the contact force being controlled by the control element as a function of the torque of the electric motor.

15. The positioning unit according to claim 1, wherein the positioning unit has a holding frame for fastening the positioning device above a vehicle, the fixed bearing being disposed on the holding frame.

16. The positioning unit according to claim 15, wherein the fixed bearing is able to be fastened to the holding frame so as to be retractable in the vertical direction.

17. The positioning unit according to claim 1, wherein the positioning unit has a contact device having two charging contact carriers having at least two charging contacts disposed thereon, the charging contacts being connected to each other via parallel rods of the contact device having two parallel connective rods and having two parallel carrier rods, the carrier rods each being connected to the connective rods via connective joints, which are space apart from each other, in one of two parallel movement planes and forming a parallelogram with the connective rods.

18. The positioning unit according to claim 17, wherein the connective rods are connected to the lower segment of the contact device via two spaced-apart carrier joints in a parallel carrier plane extending centrally to the movement plane, the charging contact carriers each being connected to the carrier rod via a swivel joint, the swivel joints being orthogonal in relation to the connective joints, the charging contact carriers each coaxially holding the charging contacts in relation to the rotational axis.

19. A method for forming an electrically conductive connection between a stationary charging station and a vehicle, in particular an electric bus or the like, an electric charging contact of a positioning unit-being moved in relation to a charging contact surface and being contacted therewith by means of the positioning unit, a positioning device of the positioning unit being driven by a drive unit of the positioning unit, the charging contact being positioned between a contacting position for transmitting current and a retraction position for interrupting current by means of the positioning device, a displacing force on the positioning device is produced by means of a drive device of the drive device, and a spring device of the drive device mechanically interacting with the displacement drive, the spring device comprising at least one contact spring, a contact force acting on the charging surface being produced by the displacement drive and at least one contact spring,
wherein an upper segment of the positioning device is linearly moved on a fixed bearing in a vertical displacement direction, and a lower segment of the positioning device is linearly moved on the upper segment in the vertical displacement direction, the contact spring being coupled with the fixed bearing and the upper segment, the upper segment being moved in relation to the lower segment by means of the displacement drive.

20. The method according to claim 19, wherein a movement of the positioning device from the retracted position to the contacting position has the following steps:
a. moving the lower segment and the electric charging contact disposed thereon downward and in relation to the upper segment by means of the displacement drive, the upper segment abutting against a stop of the positioning device;
b. stopping the lower segment in the contacting position by abutting the electric charging contact against the charging contact surface;
c. moving the upper segment upward and in relation to the lower segment and the fixed bearing by continuing to operate the displacement drive and simultaneously producing the contact force by tensing and relaxing the contact spring coupled with the upper segment and the fixed bearing.

* * * * *